US010055690B2

United States Patent
Andreev et al.

(10) Patent No.: US 10,055,690 B2
(45) Date of Patent: Aug. 21, 2018

(54) QUANTUM LEAKAGE SUPPRESSION METHOD

(71) Applicant: HITACHI, LTD., Chiyoda-ku, Tokyo (JP)

(72) Inventors: Aleksey Andreev, Cambridge (GB); David Williams, Cambridge (GB)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/631,548

(22) Filed: Jun. 23, 2017

(65) Prior Publication Data

US 2017/0372218 A1  Dec. 28, 2017

(30) Foreign Application Priority Data

Jun. 28, 2016 (EP) .................... 16176751

(51) Int. Cl.
 *G06N 99/00* (2010.01)
(52) U.S. Cl.
 CPC ................. *G06N 99/002* (2013.01)
(58) Field of Classification Search
 None
 See application file for complete search history.

(56) References Cited

U.S. PATENT DOCUMENTS

| | | | | |
|---|---|---|---|---|
| 2004/0165454 | A1* | 8/2004 | Amin ................. | B82Y 10/00 365/200 |
| 2015/0358022 | A1* | 12/2015 | McDermott, III . | H03K 19/1958 326/5 |
| 2017/0214410 | A1* | 7/2017 | Hincks ................. | G05B 17/02 |

FOREIGN PATENT DOCUMENTS

| | | |
|---|---|---|
| EP | 1860600 A1 | 5/2006 |
| EP | 2264653 A1 | 6/2009 |

OTHER PUBLICATIONS

Del Duce, A. et al.; "Design and optimisation of quantum logic circuits for a three-qubit Deutsch-Jozsa algorithm implemented with optically-controlled, solid-state quantum logic gates"; http://arxiv.org/pdf/0910.1673.pdf.
Fisher, R.M.; "Optimal Control of Multi-Level Quantum Systems"; http://mediatum.ub.tum.de/doc/1002028.pdf.
Shor, P.W.; "Scheme for reducing decoherence in quantum computer memory"; Physical Review A; vol. 52; p. R2493 (1995).
Wong, Clement H. et al.; "High-fidelity singlet-triplet S-T qubits in inhomogeneous magnetic fields"; Physical Review B, vol. 92; issue 4; article No. 045403 (2015).

(Continued)

*Primary Examiner* — Jany Richardson
(74) *Attorney, Agent, or Firm* — Miles & Stockbridge P.C.

(57) ABSTRACT

A method of reducing quantum leakage in a qubit device which includes receiving a set of energy level values for a multi-level system which includes first and second working levels |0>, |1> which provide a qubit, and at least one other level |2>, and performing an iteration of determining quantum leakage from at least one of the first and second working levels to the at least one other level for a quantum operation A for at least one pulse wherein each pulse has a respective pulse duration, determining whether the quantum leakage is greater than or equal to a threshold value; and, based on the quantum leakage being greater than or equal to the threshold value, changing the duration of at least one of the at least one pulse.

10 Claims, 5 Drawing Sheets

(56) References Cited

OTHER PUBLICATIONS

Liebermann, Per. J et al.; "Optimal Qubit Control Using Single-Flux Quantum Pulses"; Corr (Arxiv); vol. abs/1512.05495v1; No. 2; Dec. 17, 2015; pp. 1-4; XP055330556.
Chen, Zijun et al.; "Measuring and suppressing quantum state leakage in a superconducting qubit" arXiv: 1509.05470v1 [quant-ph]; Sep. 17, 2015; XP055289026.
Extended Search Report issued in the corresponding European Patent Application No. 16176751.

* cited by examiner

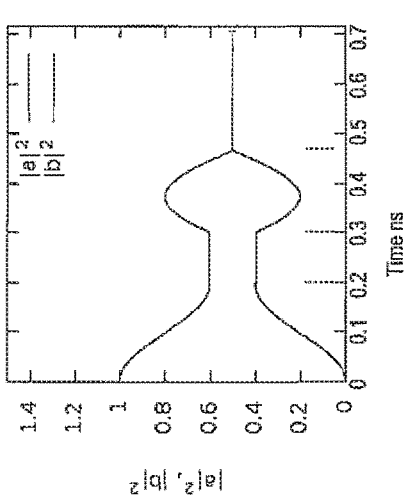
FIG. 5(a) State of the qubit on Bloch sphere. Time step=991
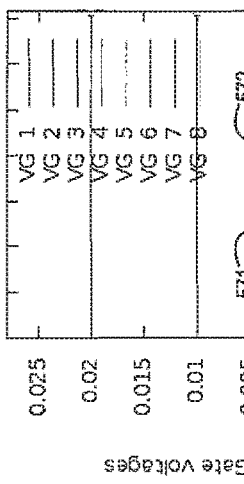
FIG. 5(b) Gate Voltages vs time
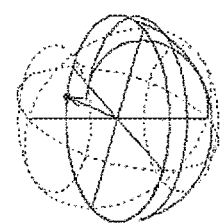
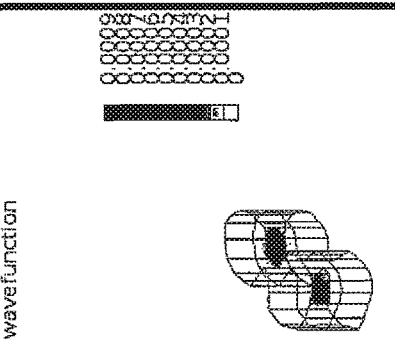
FIG. 5(c) Probabilities to be in states |0⟩ or |1⟩
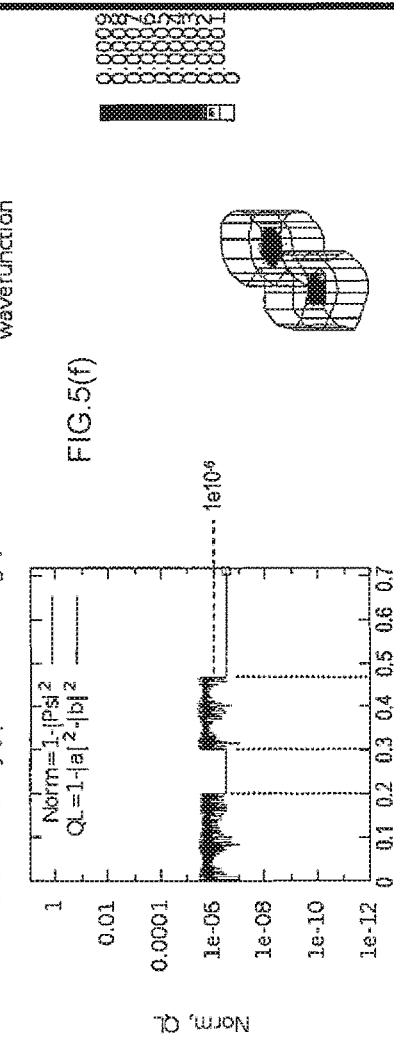
FIG. 5(d) Qubit state = a|0⟩+b|1⟩
FIG. 5(e) Loss of Fidelity (quantum leakage)
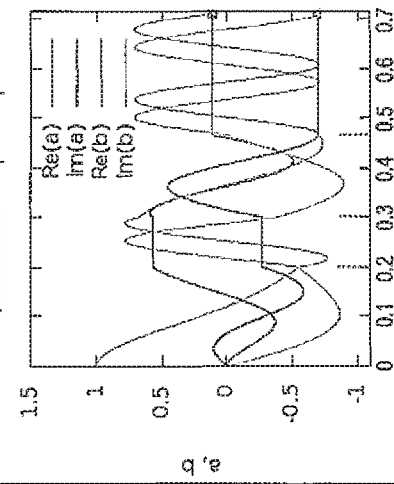
FIG. 5(f) wavefunction

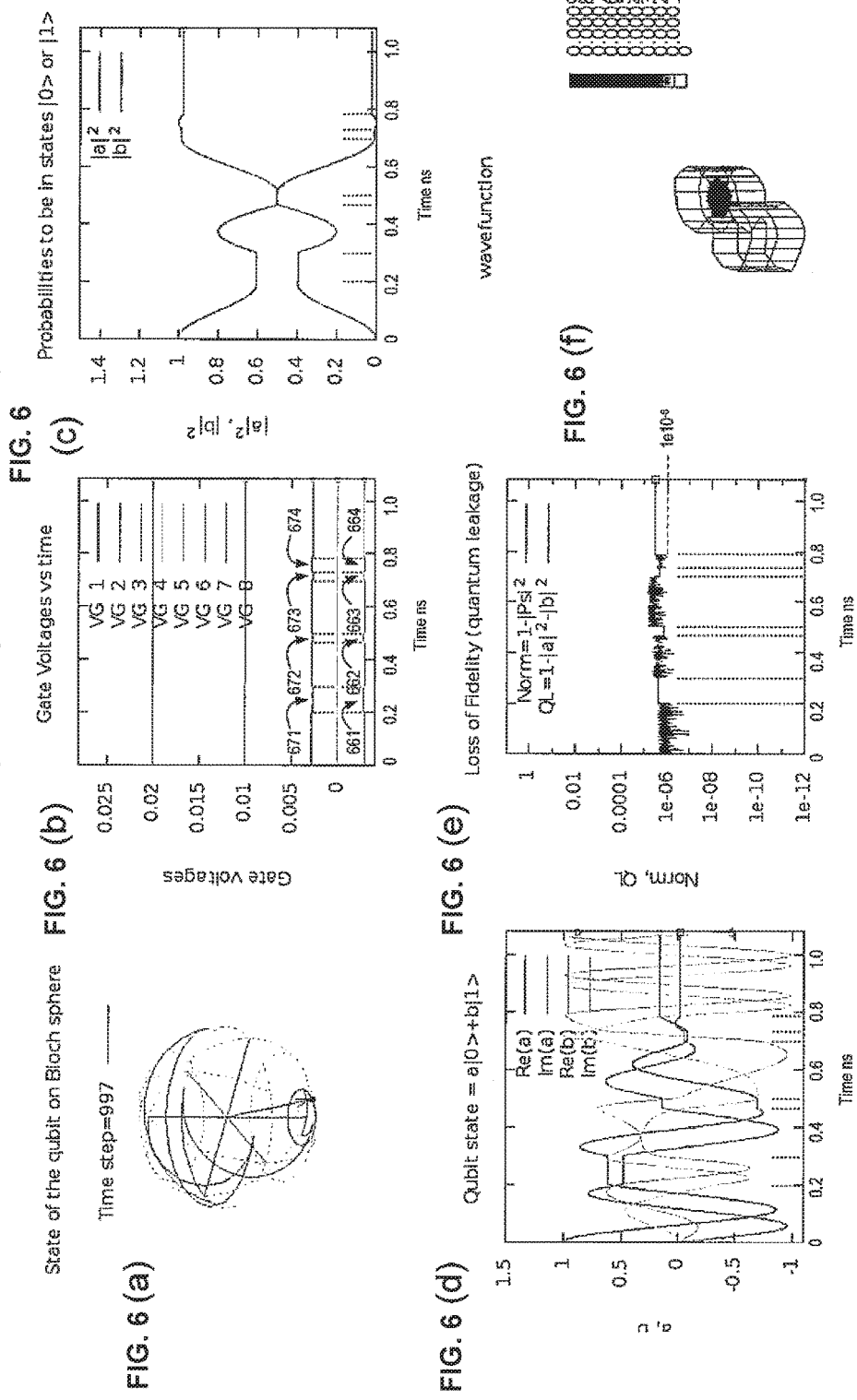

QUANTUM LEAKAGE SUPPRESSION METHOD

FIELD OF THE INVENTION

The present invention relates to quantum leakage and to a method of minimising quantum leakage in a qubit device.

BACKGROUND

A qubit can be formed in a two-level quantum system having two orthogonal basis states (or "working states"), denoted $|0\rangle$ and $|1\rangle$, which are used to define a state $\psi$ of the qubit as a superposition of the working states, namely $\alpha|0\rangle+\beta|1\rangle$, where $\alpha$ and $\beta$ are complex numbers satisfying $|\alpha|^2+|\beta|^2=1$. A quantum computing algorithm consists of one or more successive operations that can be performed on a qubit in an initial state $\psi_i$ to transform the qubit into a final state $\omega_f$.

A multi-level system providing a qubit typically contains additional states, for example, in the form of higher-energy excited states. During qubit operations, the state of the qubit (or multiple entangled qubits) may not necessarily always be confined to the phase space of the two working states of the qubit and so an admixture of the working states and the additional states can arise. This problem is usually referred to a "loss of fidelity" or "quantum leakage". It may also be described as an intrinsic path for decoherence, i.e. related only to the qubit or the quantum system itself, not to its interaction with the environment.

Quantum leakage is an inherent property of almost all real-world quantum systems and is a fundamental problem. It is a significant issue for quantum computers because it can limit or prevent certain quantum algorithms from being executed.

Efforts have been made to improve (or "optimise") quantum algorithms. However, these efforts have focused on using fewer operations and making operations shorter, as described, for example, in A Del Duce et al: "Design and optimisation of quantum logic circuits for a three-qubit Deutsch-Jozsa algorithm implemented with optically-controlled, solid-state quantum logic gates" http://arxiv.org/pdf/0910.1673.pdf and R. M. Fisher: "Optimal Control of Multi-Level Quantum Systems" http://mediatum.ub.tum.de/doc/1002028/1002028.pdf. These approaches, however, do not consider loss of fidelity and, from a mathematical point of view, are only concerned with phase space corresponding to the working states of the qubits.

A well-known technique for reducing the quantum errors, such as quantum leakage, is quantum error correction, as described in P. W. Shor: "Scheme for reducing decoherence in quantum computer memory", Physical Review A, volume 52, page R2493 (1995). However, this technique requires additional components, e.g. additional qubits.

EP 2 264 653 A1 describes a symmetric gate arrangement to reduce the quantum leakage to excited states.

Clement H. Wong, M. A. Eriksson, S. N. Coppersmith and Mark Friesen: "High-fidelity singlet-triplet S-T qubits in inhomogeneous magnetic fields", Physical Review B, volume 92, issue 4, article number 045403 (2015) proposes an optimized set of quantum gates for a singlet-triplet qubit in a double quantum dot with two electrons utilizing the S-T subspace. Qubit rotations are driven by an applied magnetic field and a field gradient provided by a micromagnet. Fidelity of the qubit as a function of the magnetic fields is optimized, taking advantage of "sweet spots" where rotation frequencies are independent of the energy level detuning, providing protection against charge noise. However, the probability of leakage into a non-working state, namely between 0.0005 to 0.012, is still quite high compared to benchmark values of 0.0001.

SUMMARY

The present invention seeks to reduce quantum leakage in qubit device.

According to a first aspect of the present invention there is provided a method comprising receiving a set of energy level values for a multi-level system which includes first and second working levels $|0\rangle$, $|1\rangle$ which provide a qubit and at least one other level $|2\rangle$ and performing an iteration at least once. The iteration comprises determining quantum leakage from at least one of the first and second working levels to the at least one non-working level for a quantum operation A comprising a set of one or more pulses including a pulse having a given pulse duration, determining whether the quantum leakage is greater than or equal to a threshold value and, in dependence of the quantum leakage being greater than or equal to the threshold value, changing the duration of at least one of the at least one pulse.

This can allow high-fidelity quantum operations to be performed without the need for error correction schemes requiring additional qubits.

The method may comprise repeating the iteration, each iteration having a different given pulse duration.

Determining the quantum leakage may comprise determining:

$$\alpha_i = \sum_{j}^{N} |C_{ij}|^2$$

where $\alpha_i$ is quantum leakage for a working level i, where $i=i_1$ or $i_2$ is zero or a positive integer, and j is a non-working level, where j is zero or a positive integer and not equal to $i_1$ or $i_2$, and N is a positive integer greater than or equal to 2.

Preferably, $i=(0, 1)$ and $j\neq(0, 1)\geq 2$. Preferably, $N\geq 10$, $N\geq 50$ or $N\geq 100$.

The method may further comprise measuring the set of energy level values. Measuring the set of energy level values may comprise measuring a test multi-level system.

The threshold value may be less than or equal to $1\times 10^{-5}$ or $1\times 10^{-6}$.

Changing the duration of the at least one of the at least one pulse may comprises increasing or decreasing the duration of the pulse by a predetermined amount. For example, the predetermined amount may be equal to or greater than 1 fs, equal to or greater than 1 ps. The predetermined amount may be equal to or less than 1 ns or may be equal to or less than 1 ps.

According to a second aspect of the present in invention there is provided a method of optimising the operation of a qubit device for reducing quantum leakage to (excited) state(s). A desired elementary operation of the qubit (or multi-qubit) gates can be achieved in different ways. The elementary operation can be optimised so that the quantum leakage to one or more excited states of the qubit is suppressed. For example, for a single qubit gate with the working states $|0\rangle$ and $|1\rangle$, most of the quantum leakage for a given elementary quantum bit operation is through an excited state $|2\rangle$. The elementary quantum bit operation can be done, for example, by applying a set of pulses to a set of gates. After the operation the quantum state is given by $|c(t)\rangle = a|0\rangle + b|1\rangle + c(t)|2\rangle$, where a, b are coefficients determined by a given quantum operation, t is the duration of the pulse and c(t) the coupling coefficient which depends on the pulse duration. In an ideal situation, the coefficient c(t) should be zero. In this case, quantum leakage to this state during the quantum operation is zero and the fidelity is kept at the required level. In real situations, the duration of a pulse or respective durations of a sequence of two or more pulses can be determined such that $|c(t)|$ as a function of t is minimised and is substantially zero, e.g. less than or equal to $1 \times 10^{-6}$. Thus, quantum leakage is minimised. Accordingly, fidelity level is kept to required level and a series of such quantum operations does not lead to the loss of fidelity, which enables the operation of the qubit device. This can be applied to more complicated quantum operations for two-qubit and multi-qubit devices.

BRIEF DESCRIPTION OF THE DRAWINGS

Certain embodiments of the present invention will now be described, by way of example, with reference to the accompanying drawings, in which:

FIGS. 5a to 5f are six plots illustrating behaviour of a qubit during an operation which has been optimized using a process in accordance with the present invention; and FIGS. 6a to 6f are six plots illustrating behaviour of a qubit during an operation which has been not been optimized using a process in accordance with the present invention.

DETAILED DESCRIPTION OF CERTAIN EMBODIMENTS

Quantum Leakage

Figure 1:
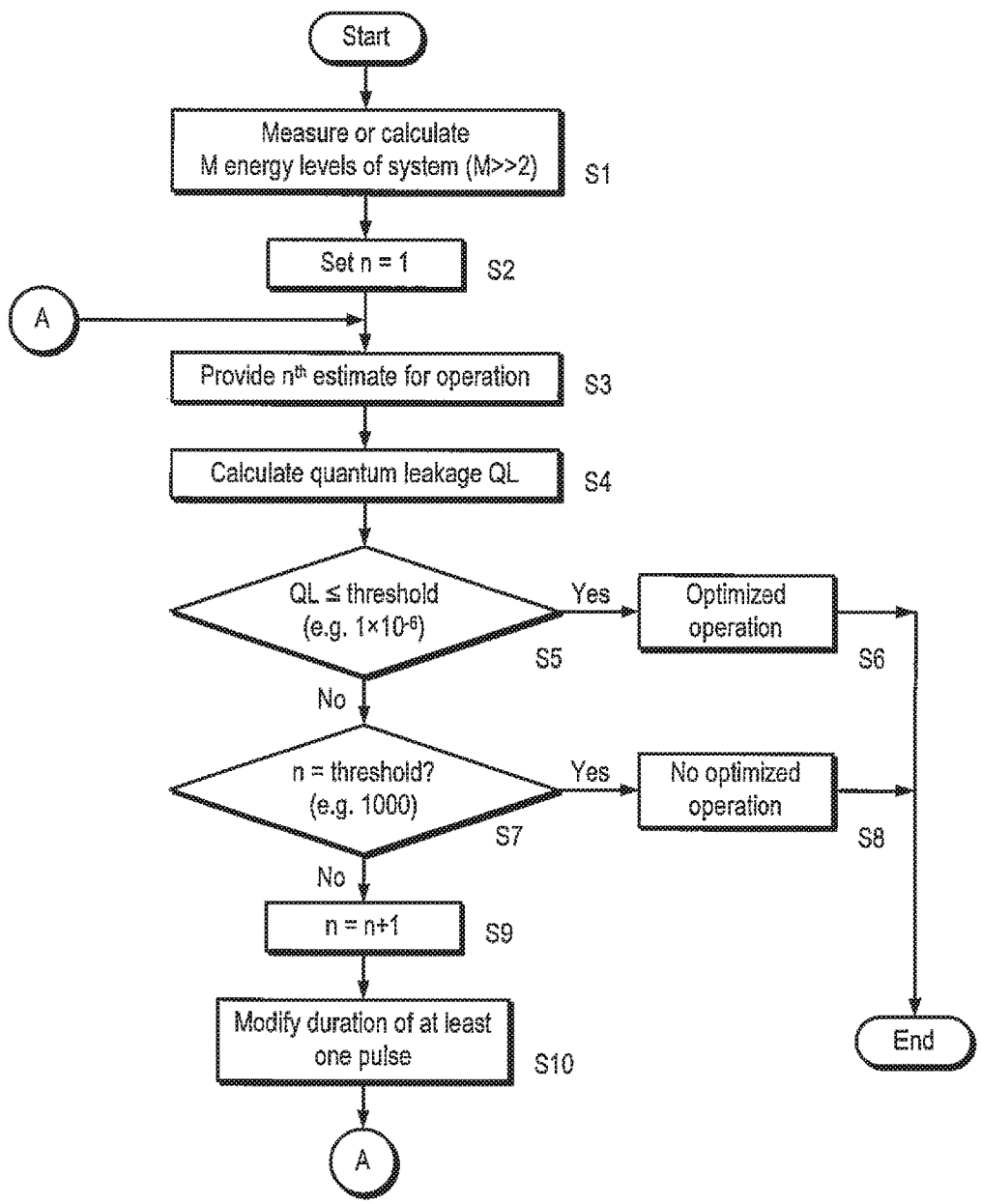
FIG. 1 is a process flow diagram of a method of optimizing an operation so as to reduce quantum leakage.

A multi-level system providing a qubit has N+1 orthogonal available states $|j\rangle$ where $j = 0, 1, 2, \ldots, N$. The available states include a first working state $|0\rangle$ and a second working state $|1\rangle$, that is, the first and second working states are labelled by $j=0$ and $j=1$ respectively. The first working state and the second working state can be used to define a qubit. The available states include N−1 non-working states, labelled by $j > 1$.

If the system is in an initial state $|\Psi_{initial}\rangle = |i\rangle$ before a quantum operation, its final state $|\Psi_{final}\rangle$ after the operation is a superposition of all available states $|j\rangle$ and is dependent upon complex coefficients $C_{ij}$, namely:

$$|\Psi_{final}\rangle = \sum_{j=0}^{N} C_{ij} |j\rangle \quad (1)$$

where $N \geq 2$, preferably $N \geq 10$, more preferably $N \geq 50$, and still more preferably $N \geq 100$. The coefficients $C_{ij}$ are generally time-dependent.

Thus, a system having an initial state which does not include non-working state components may have a final state, after a quantum operation, which does include non-working state components.

The quantum leakage degree $\alpha_i$ for a level i is defined as:

$$\alpha_i = \sum_{j \neq 0,1}^{N} |C_{ij}|^2 \quad (2)$$

where the first and second working states $|0\rangle$, $|1\rangle$ are denoted by $j=0$ and $j=1$ respectively. The quantum leakage defines the probability that a system in the first working state $|0\rangle$ or the second working state $|1\rangle$ before a quantum operation will be found in a state other than the first working state $|0\rangle$ or the second working state $|1\rangle$ after the operation.

The coefficients $C_{ij}$ are generally time-dependent, that is, are dependent upon the duration of the quantum operation. By changing the duration of on operation, the quantum leakage may be changed.

In a general case, the quantum operation can be described as a matrix:

$$|after\rangle = A|before\rangle \quad (3)$$

where the state of the system of qubits before and after the operation is denoted as $|before\rangle$ and $|after\rangle$ and the matrix A is the required quantum gate operator. For example, the quantum gate operation may be a sigma-z rotation for one qubit or a CNOT operation for a two-qubit system.

The excited states of the qubits, that is, available states other than the working states, are included in the optimisation of the matrix A in addition to the working states. Thus, optimisation of the quantum algorithm is done not only to achieve the shortest possible algorithm, but also to minimise quantum leakage to one or more states.

Therefore, for a given set of energy levels (which may be measured or calculated) and for a given matrix A (which reflects the sequence of pulses), the quantum leakage a should not exceed a threshold:

$$\alpha \leq 1 \times 10^{-6} \quad (4)$$

The quantum leakage threshold can be an order of magnitude lower.

Referring to FIG. 1, a process flow diagram of a process of optimizing a transformation will now be described:

The energy levels or states of the system are measured or calculated (step S1). The energy states may be characterised by parameters including spin, momentum, angular momentum, position, particle number, and/or any other appropriate parameter. The energy states include first and second working states and at least one non-working state.

An iteration index n is initialised to n=1 (step S2).

The $n^{th}$ estimate for a matrix describing a quantum operation $A_n$ to be optimised is provided (step S3). The matrix includes elements describing the energies of the states and the coupling between states of the system. The coupling includes at least one control field term which may describe an electric field, a magnetic field, an electromagnetic field or other appropriate field. The control field term includes at least one pulse having a respective pulse duration, where the pulse duration is the period of time for which the pulse is applied.

An initial state $|\varphi_{initial}\rangle$ is determined and a final state $|\varphi_{final}\rangle$ is determined by applying the quantum operation $A_n$ to the initial state $|\varphi_{initial}\rangle$. The quantum leakage a to non-working states is determined (step S4).

The quantum leakage a is compared with a threshold value $\alpha_{max}$ (step S5). If the quantum leakage a is less than or equal to a threshold value, the process ends (step S6).

If the quantum leakage is greater than the threshold value $\alpha_{max}$, the iteration index n is compared with a maximum number of iterations $n_{max}$ (step S7). If the iteration index is equal to the maximum number of iterations $n_{max}$, the process ends (step S9).

If the iteration index is less than the maximum number of iterations $n_{max}$, the iteration index is increased by 1 (step S10). The duration of one or more of the at least one control field pulses is modified to form the $(n+1)^{th}$ estimate of the operation $A_{n+1}$ (step S11) and the process returns to step S3.

Quantum Dot System

Figure 2:
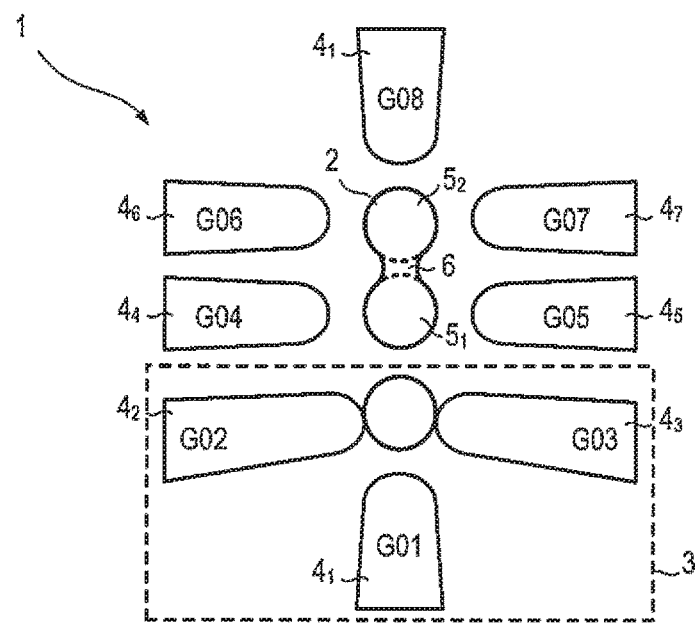
FIG. 2 is a plan view of a qubit device.
Figure 3:
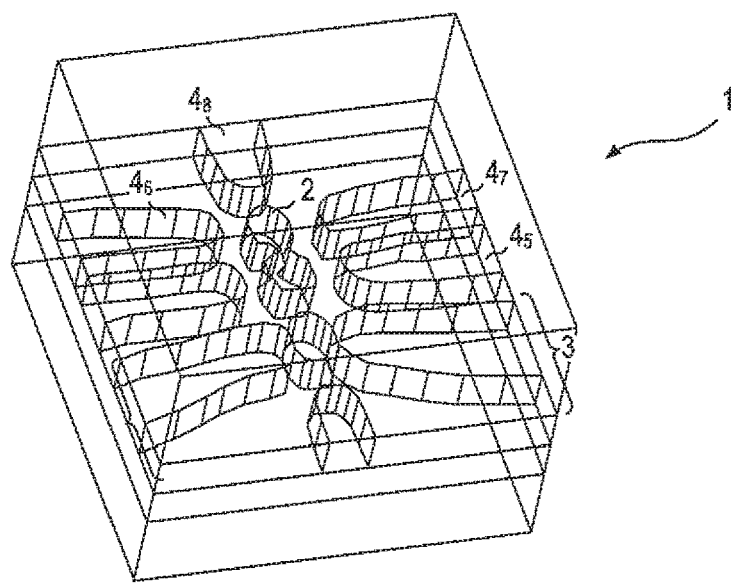
FIG. 3 is a three-dimensional wire-frame model of the qubit device shown in FIG. 2.

Referring to FIGS. 2 and 3, a qubit device 1 comprising an isolated double quantum dot system 2 and a single-electron transistor 3 is shown. The single-electron transistor 3 includes a gate $4_1$ and source and drain leads $4_2$, $4_3$. The device 1 also includes gates $4_4$, $4_5$, $4_6$, $4_7$, $4_8$ for controlling the double quantum dot system 2. The gates and leads are also labelled G1, G2, G3, G4, G5, G6, G7, G8 and to which respective biases V1, V2, V3, V4, V5, V6, V7, V8 can be applied.

The device 1 is formed in a thin layer of monocrystalline crystal silicon using trench isolation. The device 1 is similar to devices described in EP 1 860 600 A1 and EP 2 264 653 A1 which are incorporated herein by reference.

Calculations of quantum leakage are carried out by modelling the isolated double quantum dot system 2 which defines a charge qubit. This approach can be used to model other systems comprising two or more qubits, e.g. a one-dimensional or a two-dimensional array of coupled double quantum dots.

Quantum leakage depends on several parameters including choice of working levels and shape and duration of applied pulse(s).

Using the plane wave expansion method, the three-dimensional Schrödinger equation is solved for the isolated double quantum dot 2. The full Hamiltonian of the system is considered using a M×M matrix, where M>>2. For example, M≥10, preferably M≥50 and, more preferably, M≥100. The number M determines the number of non-working states considered. For example, if M=3, then one non-working state and two working states are considered. The different nature of dimensional quantisation is considered, i.e. whether the states are s-like, p-like, d-like etc.

The isolated double quantum dot system 2 consists of first and quantum dots $5_1$, $5_2$ defined in respective regions of silicon connected by a silicon bridge 6 surrounded by silicon dioxide. For modelling, the regions $5_1$, $5_2$, 6 are taken to be cube-shaped.

Using optical or electrical measurements or using calculations based on the shape and dimensions of the quantum dots $5_1$, $5_2$ and the bridge 6, the lowest M energy levels of the system can be found.

Figure 4:
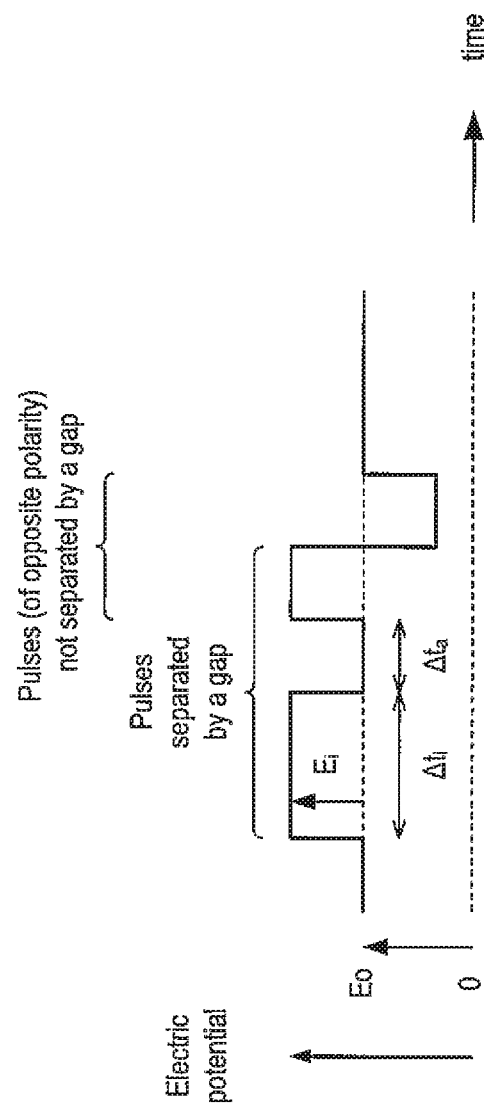
FIG. 4 illustrates a sequence of electric potential pulses.

Referring to FIG. 4, a sequence of electric potential pulses is applied to the isolated double quantum dot system 2 to perform a transformation (or "gate operation" or simply "operation"). An electric potential can be applied to the system by one gate, a pair of spaced-apart gates (for example, on opposite sides of the system) or a combination of pairs of spaced-apart gates. Preferably, pairs of gates are used so as to maintain a constant electric field potential, as described in EP 2 264 653 A1 ibid.

A sequence of pulses can be offset by a fixed electric potential, $E_0$. For example, the offset may be used to place the system in an initial state. The offset may be positive or negative. The offset may be zero, i.e. $E_0$=0.

For a given operation, a sequence may include zero, one, two or more than two positive pulses relative to an offset and/or zero, one, two or more than two negative pulses. A pulse k has a respective polarity, i.e. positive or negative, a respective magnitude $|E_k|$ and a respective duration, $\Delta t_k$. Two adjacent pulses can be separated by a gap of respective duration, $\Delta t_a$. A pulse is preferably a square pulse. However, other shapes of pulses (e.g. triangular, sinusoidal etc.) can be used. A negative pulse may follow a positive pulse and vice versa.

Referring to FIGS. 5a, 5b, 5c, 5d, 5e and 5f, simulated properties of the system 2 are shown for an optimised set of pulses 561, 562, 571, 572 found using the process hereinbefore described.

FIG. 5a illustrates the Bloch sphere showing the final state |after> of the qubit after the quantum operation consisting of the optimised set of pulses.

FIG. 5b illustrates plots of applied voltages to the gates G01-G08 against time. Gate G01 is held at 20 mV, gate G02 is held at 10 mV and gate G08 is held at 0 V. Gate G07 is held at 3 mV and gate G06 is held at −3 mV. A first electric potential pulse 561, 571 is applied by simultaneously reducing the voltage applied to gate G07 by 0.1 mV (relative to offset) and increasing the voltage applied to gate G06 by 0.1 mV (relative to offset) for 100 ps. A second electric potential pulse 562, 572 immediately follows the first pulse and is applied by simultaneously increasing the voltage applied to gate G07 by 0.1 mV (relative to offset) and decreasing the voltage applied to gate G06 by 0.1 mV (relative to offset) for 160 ps.

FIG. 5c illustrates probabilities of finding the electron in two states. FIG. 5d shows plots of complex coefficients of the states |0> and |1>. FIG. 5e shows a plot of loss of fidelity vs time. FIG. 5e shows a two-dimensional colour (greyscale) map projection and the three-dimensional structure of the system 2 used in simulations.

As can be seen from FIG. 5e, the loss of fidelity was suppressed by using optimum quantum algorithm and was kept below $1 \times 10^{-6}$ after the operation.

Referring to FIGS. 6a, 6b, 6c, 6d, 6e and 6f, simulated properties of the system 2 are shown for another set of pulses 661, 662, 663, 664, 671, 672, 673, 674 which have not been optimized.

It is clear that, in contrast to the optimised set of pulses where the fidelity loss after the operation is below $1 \times 10^{-6}$, the non-optimised set of pulses has a fidelity loss greater than $1 \times 10^{-6}$.

It will be appreciated that many modifications may be made to the embodiments hereinbefore described.

Although working states are usually the lowest levels in a system and, thus, non-working states are usually excited states, a non-working state can be a ground state.

The approach can be used not only for charge qubits, but also for other types of qubits such as spin qubits.

Moreover, the approach can be used not only for qubits, but can also be used for qutrits (i.e. three-level qubits).

The invention claimed is:

1. A method comprising:
receiving a set of energy level values for a multi-level system which includes first and second working levels |0>, |1>, which provide a qubit, and at least one other level |2>; and
performing an iteration at least once comprising
determining an estimate of a quantum operation A, said estimate comprising a plurality of first elements associated with said set of energy level values for said first and second working levels |0>, |1>, and said at least one other level |2>, and at least a second element associated with a coupling coefficient comprising at least one control field term comprising at least one pulse having a pulse duration;

determining quantum leakage from at least one of the first and second working levels to the at least one other level for said quantum operation A;

determining whether the quantum leakage is greater than or equal to a threshold value; and based on the quantum leakage being greater than or equal to the threshold value, changing the pulse duration of the at least one said pulse to minimize said coupling coefficient so as to maintain said quantum leakage at or below said threshold value.

2. A method according to claim 1 comprising repeating the iteration for a different given pulse duration.

3. A method according to claim 1, wherein determining quantum leakage comprises determining:

$$\alpha_i = \sum_j^N |C_{ij}|^2$$

where $\alpha_i$ is quantum leakage for a working level i, where i is zero or a positive integer, and j is a non-working level, where $C_{ij}$ are complex coefficients and j is zero or a positive integer and not equal to i, and N is a positive integer greater than or equal to 2.

4. A method according to claim 3, wherein i=(0, 1) and j≠(0, 1)≥2.

5. A method according to claim 3, wherein N≤10, N≥50 or N≥100.

6. A method according to claim 1, further comprising measuring the set of energy level values.

7. A method according to claim 6, wherein measuring the set of energy level values comprises measuring a test multi-level system.

8. A method according to claim 1, wherein the threshold value is less than or equal to $1\times10^{-5}$.

9. A method according to claim 1, wherein the threshold value is less than or equal to $1\times10^{-6}$.

10. A method according to claim 1, wherein changing the duration of the at least one of the at least one pulse comprises increasing or decreasing the duration of the pulse by a predetermined amount.

* * * * *